US010097711B2

(12) United States Patent
Suzuki et al.

(10) Patent No.: US 10,097,711 B2
(45) Date of Patent: Oct. 9, 2018

(54) SHEET PROCESSING DEVICE AND IMAGE FORMING SYSTEM

(71) Applicants: Nobuyoshi Suzuki, Tokyo (JP); Hidehiko Fujiwara, Tokyo (JP); Yuusuke Shibasaki, Kanagawa (JP); Wataru Takahashi, Toyko (JP); Katsuhiro Kosuge, Kanagawa (JP); Koki Sakano, Kanagawa (JP); Takuya Morinaga, Tokyo (JP); Akira Kunieda, Tokyo (JP); Makoto Hidaka, Tokyo (JP); Shohichi Satoh, Kanagawa (JP); Yohsuke Haraguchi, Kanagawa (JP)

(72) Inventors: Nobuyoshi Suzuki, Tokyo (JP); Hidehiko Fujiwara, Tokyo (JP); Yuusuke Shibasaki, Kanagawa (JP); Wataru Takahashi, Toyko (JP); Katsuhiro Kosuge, Kanagawa (JP); Koki Sakano, Kanagawa (JP); Takuya Morinaga, Tokyo (JP); Akira Kunieda, Tokyo (JP); Makoto Hidaka, Tokyo (JP); Shohichi Satoh, Kanagawa (JP); Yohsuke Haraguchi, Kanagawa (JP)

(73) Assignee: RIOCH COMPANY, LIMITED, Tokyo (JP)

( * ) Notice: Subject to any disclaimer, the term of this patent is extended or adjusted under 35 U.S.C. 154(b) by 67 days.

(21) Appl. No.: 15/163,850

(22) Filed: May 25, 2016

(65) Prior Publication Data
US 2016/0360053 A1 Dec. 8, 2016

(30) Foreign Application Priority Data
Jun. 4, 2015 (JP) .................................. 2015-113848

(51) Int. Cl.
*B65H 37/04* (2006.01)
*H04N 1/00* (2006.01)
(Continued)

(52) U.S. Cl.
CPC ........... *H04N 1/00649* (2013.01); *B31F 1/07* (2013.01); *B31F 5/02* (2013.01); *B41L 43/12* (2013.01);
(Continued)

(58) Field of Classification Search
CPC ...... B31F 1/07; B31F 5/02; B31F 2201/0779; B31F 2201/00; B65H 2301/51616;
(Continued)

(56) References Cited

U.S. PATENT DOCUMENTS

2007/0044924 A1\* 3/2007 Yoshie .................. B42C 9/0006
156/578
2013/0214470 A1 8/2013 Yokomizo
(Continued)

FOREIGN PATENT DOCUMENTS

JP 03-183595 8/1991
JP 04-173396 6/1992
(Continued)

*Primary Examiner* — Leslie A Nicholson, III
(74) *Attorney, Agent, or Firm* — Harness, Dickey & Pierce, P.L.C.

(57) ABSTRACT

A sheet processing device includes: a stacking unit configured to stack a plurality of sheets to obtain a sheet bundle; a stitched-sheet number acquiring unit configured to acquire a number of sheets in the sheet bundle, which is a target to be stitched; a permanent stitching unit configured to permanently stitch the sheet bundle; a temporary stitching unit configured to be capable of temporarily stitching a plurality of areas of the sheet bundle; a selecting unit configured to select any one of the permanent stitching unit and the temporary stitching unit to be used; and a stitching-process
(Continued)

control unit configured to, when the temporary stitching unit is selected by the selecting unit, control the temporary stitching unit so as to change a number of areas that are stitched by the temporary stitching unit.

9 Claims, 6 Drawing Sheets

(51) Int. Cl.
| | | |
|---|---|---|
| B42C 1/12 | (2006.01) | |
| B31F 1/07 | (2006.01) | |
| B41L 43/12 | (2006.01) | |
| B42F 3/00 | (2006.01) | |
| B31F 5/02 | (2006.01) | |
| B65H 33/00 | (2006.01) | |
| G03G 15/00 | (2006.01) | |

(52) U.S. Cl.
CPC ............... *B42C 1/12* (2013.01); *B42F 3/00* (2013.01); *B65H 33/00* (2013.01); *B65H 37/04* (2013.01); *G03G 15/6544* (2013.01); *H04N 1/00639* (2013.01); *B31F 2201/0779* (2013.01); *B65H 2301/152* (2013.01); *B65H 2301/163* (2013.01); *B65H 2301/4212* (2013.01); *B65H 2301/4213* (2013.01); *B65H 2511/30* (2013.01); *B65H 2513/512* (2013.01); *B65H 2801/27* (2013.01); *G03G 2215/00827* (2013.01); *G03G 2215/00831* (2013.01); *G03G 2215/00852* (2013.01)

(58) Field of Classification Search
CPC . B65H 37/04; B42F 3/00; G03G 2215/00827; G03G 2215/00852; G03G 15/6544; B41L 43/12; B42C 1/12
USPC ............................................ 270/58.08, 58.09
See application file for complete search history.

(56) References Cited

U.S. PATENT DOCUMENTS

| | | | | |
|---|---|---|---|---|
| 2013/0264762 | A1* | 10/2013 | Matsushita | ............... B31F 5/02 |
| | | | | 270/58.08 |
| 2015/0003938 | A1 | 1/2015 | Morinaga et al. | |
| 2015/0030414 | A1 | 1/2015 | Takahashi et al. | |
| 2015/0063953 | A1* | 3/2015 | Taguchi | .................. B42C 19/02 |
| | | | | 412/37 |
| 2015/0076759 | A1 | 3/2015 | Kosuge et al. | |
| 2015/0093214 | A1 | 4/2015 | Takahashi et al. | |

FOREIGN PATENT DOCUMENTS

| | | |
|---|---|---|
| JP | 2013-155046 | 8/2013 |
| JP | 2013-170067 | 9/2013 |
| JP | 2014-156349 | 8/2014 |

\* cited by examiner

STAPLE MODE : SETTING SCREEN

| <STAPLE CONTAINED: MODE A><br><br>2 TO 50 SHEETS<br>ONE AREA AT TILT |  | EQUAL TO OR MORE THAN 51 SHEETS<br>50-SHEETS STITCHING AND DIVIDED PAPER EJECTION (STAPLE-CONTAINED STITCHING) |  |
|---|---|---|---|
| <STAPLE CONTAINED: MODE B><br><br>2 TO 50 SHEETS<br>2 AREAS ON LONG SIDE |  | EQUAL TO OR MORE THAN 51 SHEETS<br>50-SHEETS STITCHING AND DIVIDED PAPER EJECTION (STAPLE-CONTAINED STITCHING) |  |
| <NO STAPLES: MODE A><br><br>2 TO 5 SHEETS<br>2 AREAS AT TILT |  | EQUAL TO OR MORE THAN 6 SHEETS<br>5-SHEETS STITCHING AND DIVIDED PAPER EJECTION (HIGH SPEED: FEWER STITCHED AREAS) |  |
| <NO STAPLES: MODE B><br><br>2 TO 5 SHEETS<br>2 AREAS AT TILT |  | EQUAL TO OR MORE THAN 6 SHEETS<br>5-SHEETS STITCHING AND DIVIDED PAPER EJECTION (NORMAL: NORMAL STITCHED AREAS) |  |
| <STAPLE CONTAINED: MODE C><br><br>2 TO 5 SHEETS<br>2 AREAS AT TILT |  | EQUAL TO OR MORE THAN 6 SHEETS<br>50-SHEETS STITCHING AND DIVIDED PAPER EJECTION (STAPLE-CONTAINED STITCHING) |  |

SHEET PROCESSING DEVICE AND IMAGE FORMING SYSTEM

CROSS-REFERENCE TO RELATED APPLICATIONS

The present application claims priority under 35 U.S.C. § 119 to Japanese Patent Application No. 2015-113848, filed Jun. 4, 2015. The contents of which are incorporated herein by reference in their entirety.

BACKGROUND OF THE INVENTION

1. Field of the Invention

The present invention relates to a sheet processing device and an image forming system.

2. Description of the Related Art

There are conventionally-known image forming systems that include a sheet processing device that performs a stitching process on a bundle of sheets, on which an image has been formed by an image forming apparatus. Some of the sheet processing device include both a permanent stitching unit that permanently stitches a bundle of sheets by using metallic staples, or the like, and a temporary stitching unit that temporarily stitches a bundle of sheets by using a press-and-stitch technique, or the like, without using any metallic staples in terms of resource saving and recycling efficiency.

Japanese Unexamined Patent Application Publication No. 2013-170067 discloses that, if the number of output sheets exceeds the allowable number of stitching-processed sheets, which may be stitched at one time by the temporary stitching unit, a stitching process is performed by using the permanent stitching unit, of which the allowable number of stitching-processed sheets is larger, instead of the temporary stitching unit. Alternatively, if the number of output sheets exceeds the allowable number of stitching-processed sheets of the temporary stitching unit, the sheets are divided by the allowable number of stitching-processed sheets, and a stitching process is performed by the temporary stitching unit.

When a user selects execution of a stitching process and makes a print command, the number of print surfaces is changed due to two-sided/combined editing, or the like; however, a few users give consideration to make the number of output sheets fall within the allowable number of stitching-processed sheets while in execution. Generally, as the temporary stitching unit is configured such that it does not use any intervening substances, such as metallic staples or adhesive agents, its majority has the allowable number of stitching-processed sheets of about 5; however, when a stitching process is executed, the number of output sheets often exceeds 5. Under such a circumstance, during the former stitching process, disclosed in Japanese Unexamined Patent Application Publication No. 2013-170067, the temporary stitching unit is switched to the permanent stitching unit, which is not intended by a user who does not desire to use metallic staples, and an undesirable printed material is produced.

Furthermore, although the time of a stitching process by the permanent stitching unit using metallic staples is usually around 500 ms, the time of a stitching process by the temporary stitching unit using a press-and-stitch technique, or the like, is often 4 seconds to 10 seconds. Therefore, during the latter stitching process, disclosed in Japanese Unexamined Patent Application Publication No. 2013-170067, if there are a large number of sheets, it takes more processing time than expected by a user; thus, there is a possibility that productivity is significantly reduced and user's task efficiency is decreased. However, for some use applications, there is also a case where, although a stitching process is performed by the temporary stitching unit, stitching needs to be tight regardless of the processing time.

SUMMARY OF THE INVENTION

According to one aspect of the present invention, there is provided a sheet processing device including: a stacking unit configured to stack a plurality of sheets to obtain a sheet bundle; a stitched-sheet number acquiring unit configured to acquire a number of sheets in the sheet bundle, which is a target to be stitched; a permanent stitching unit configured to permanently stitch the sheet bundle; a temporary stitching unit configured to be capable of temporarily stitching a plurality of areas of the sheet bundle; a selecting unit configured to select any one of the permanent stitching unit and the temporary stitching unit to be used; and a stitching-process control unit configured to, when the temporary stitching unit is selected by the selecting unit, control the temporary stitching unit so as to change a number of areas that are stitched by the temporary stitching unit.

According to another aspect of the present invention, there is provided an image forming system including: an image forming apparatus configured to form an image on a sheet; and a sheet processing device configured to perform a predetermined process on a sheet, on which an image has been formed by the image forming apparatus, wherein the sheet processing device includes: a stacking unit configured to stack a plurality of sheets to obtain a sheet bundle; a stitched-sheet number acquiring unit configured to acquire a number of sheets in the sheet bundle, which is a target to be stitched; a permanent stitching unit configured to permanently stitch the sheet bundle; a temporary stitching unit configured to be capable of temporarily stitching a plurality of areas of the sheet bundle; a selecting unit configured to select any one of the permanent stitching unit and the temporary stitching unit to be used; and a stitching-process control unit configured to, when the temporary stitching unit is selected by the selecting unit, control the temporary stitching unit so as to change a number of areas that are stitched by the temporary stitching unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result. An embodiment of the present invention will be described in detail below with reference to the drawings.

Figure 1:
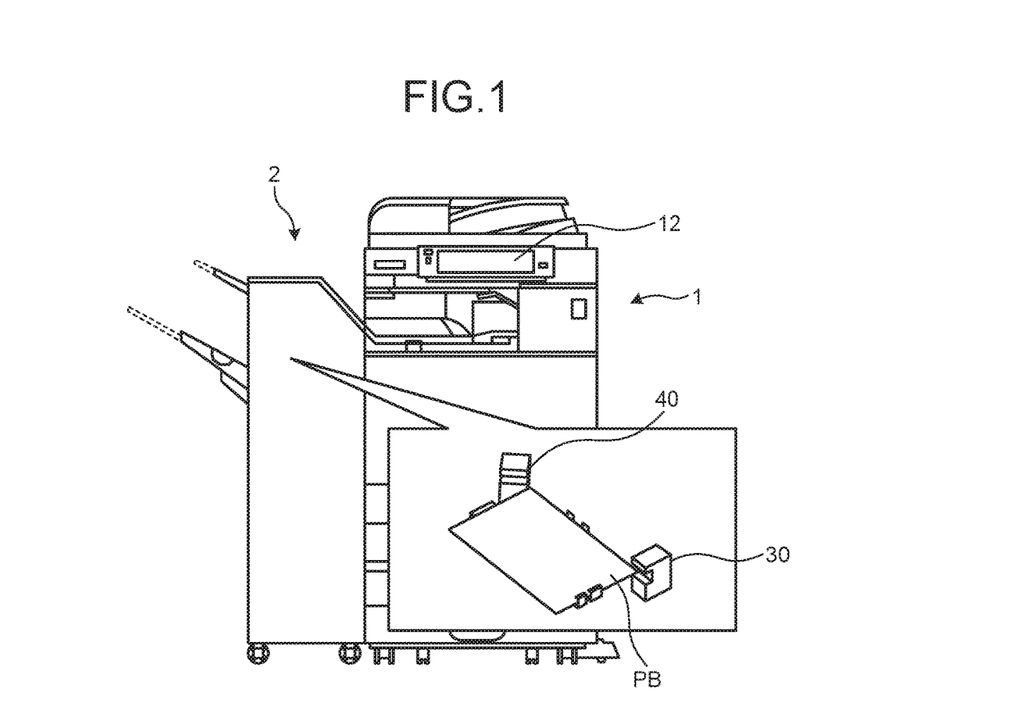
FIG. 1 is a schematic configuration diagram that illustrates a configuration of an image forming system according to the present embodiment.

An explanation is given below of an embodiment of an image forming system, to which the present invention is applied. FIG. 1 is a schematic configuration diagram that illustrates the configuration of the image forming system according to the present embodiment. Furthermore, in various drawings, the same reference numeral is applied to the same or equivalent components, and duplex explanations are omitted appropriately. As illustrated in FIG. 1, in the image forming system according to the present embodiment, the forming system includes an image forming apparatus 1 and sheet processing device 2, which is a sheet processing device 2 that is connected subsequently to the image forming apparatus 1. Here, in the present embodiment, an explanation is given of the image forming system that has the combination of the image forming apparatus 1 and the sheet processing device 2; however, it is possible to make application for a case where it is used as an image forming apparatus that has a built-in sheet processing device or a sheet processing device that is separated from an image forming apparatus.

The above-described image forming apparatus 1 forms an image on one side or two sides of a sheet P on the basis of the image data, read by a scanner unit in a case where the image forming apparatus 1 is a copier, or the image data, input from an external device such as a personal computer. According to the present embodiment, the image forming apparatus 1 uses an electrophotographic system as an image forming system; however, any other systems, such as an inkjet system or a thermal-transfer system, may be used.

Figure 2:
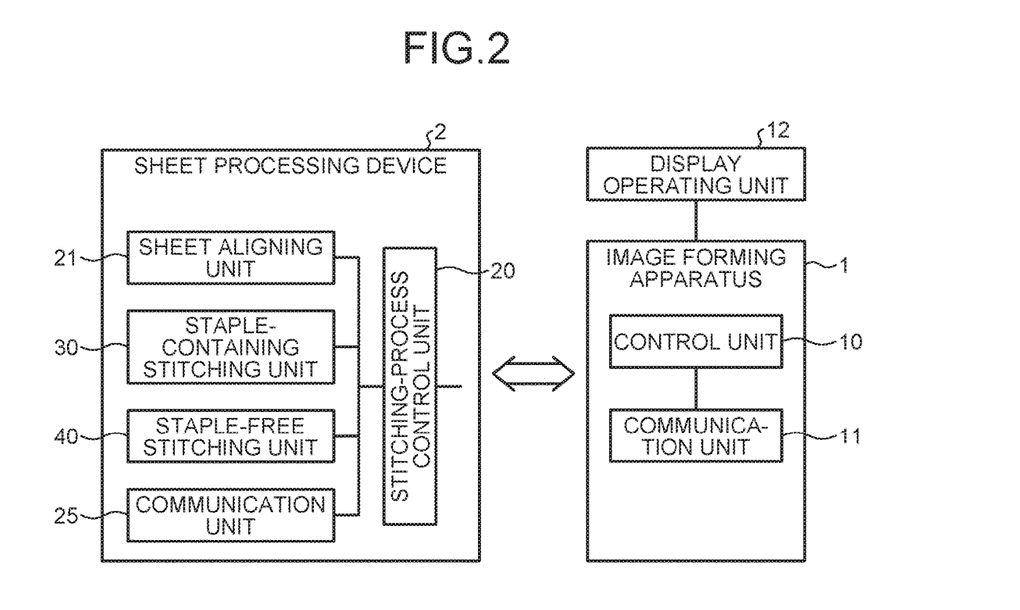
FIG. 2 is a block diagram that illustrates a configuration of the relevant part of a control system of the image forming system.

FIG. 2 is a block diagram that illustrates an example of the configuration of the relevant part of the control system of the image forming system according to the present embodiment. As illustrated in FIG. 2, the image forming apparatus 1 includes a control unit 10 that includes a CPU, ROM, RAM, or the like, and that controls each unit within the image forming apparatus 1, and a communication unit 11 for communicating with the sheet processing device 2. Furthermore, the image forming apparatus 1 includes a display operating unit 12 with which a user may perform operations on documents through a key input or touch input, or the like.

The sheet processing device 2 includes a sheet aligning unit 21, which is a stacking unit, a staple-containing stitching unit 30, which is a permanent stitching unit, a staple-free stitching unit 40, which is a temporary stitching unit, or the like. Furthermore, the sheet processing device 2 includes a stitching-process control unit 20 that controls the sheet aligning unit 21, the staple-containing stitching unit 30, the staple-free stitching unit 40, or the like, a communication unit 25 for communicating with the image forming apparatus 1, or the like. Here, the stitching-process control unit 20 also functions as a stitched-sheet number acquiring unit that acquires the number of sheets in a sheet bundle PB, which is the bundle of sheets to be stitched, from the control unit 10 of the image forming apparatus 1 and as a selecting unit that selects any one of the staple-containing stitching unit 30 and the staple-free stitching unit 40 while in use.

Figure 3:
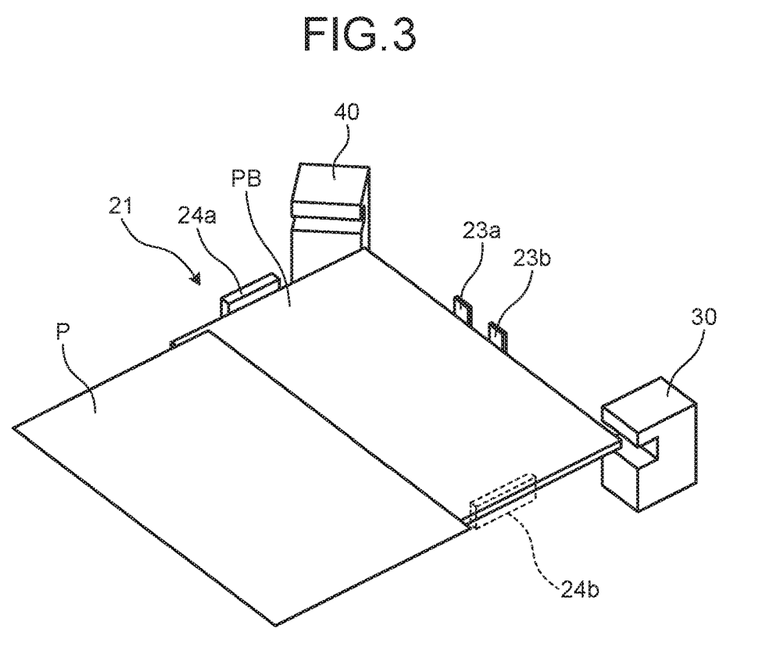
FIG. 3 is a perspective view that illustrates a configuration of the relevant part of a sheet processing device.
Figure 4:
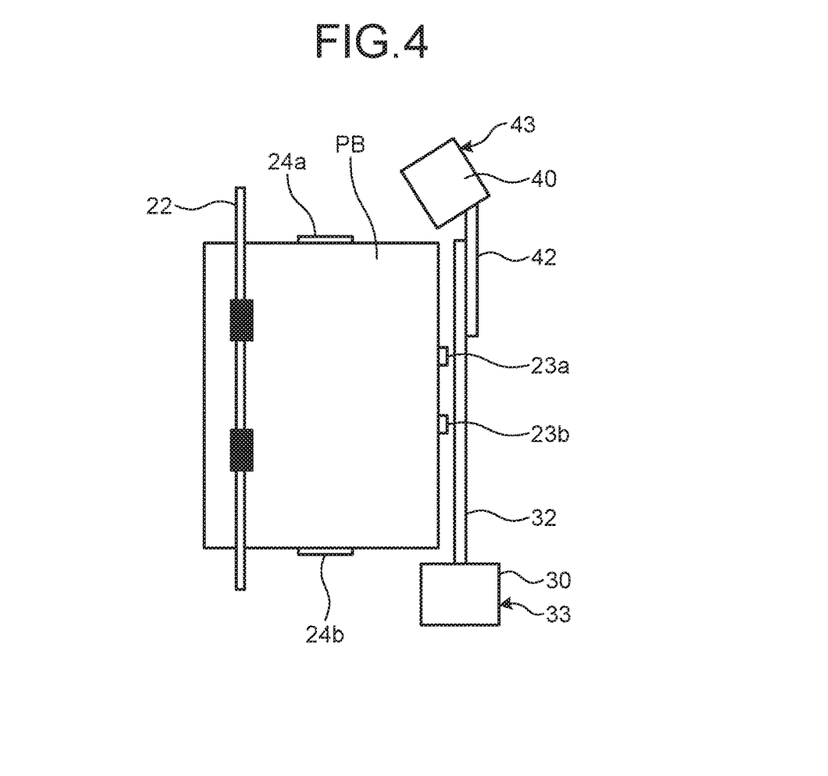
FIG. 4 is a top view that illustrates a configuration of the relevant part of the sheet processing device.

FIG. 3 is a perspective view that illustrates a configuration of the relevant part of the sheet processing device. FIG. 4 is a top view that illustrates a configuration of the relevant part of the sheet processing device. As illustrated in FIGS. 3 and 4, the sheet aligning unit 21 of the sheet processing device 2 is a unit that stacks and aligns the sheets P, output from the image forming apparatus 1, to obtain the sheet bundle PB, and it includes a conveyance roller 22, trailing-edge alignment stoppers 23a, 23b, jogger fences 24a, 24b, and the like. The conveyance roller 22 is a roller that conveys the sheet P, sent from the image forming apparatus 1, to the sheet aligning unit 21 and that conveys the sheet bundle PB, on which a stitching process has been performed, to a paper ejection unit. The trailing-edge alignment stoppers 23a, 23b are the reference surfaces that align the trailing edge of the sheet P, conveyed from the image forming apparatus 1, when it is brought into contact. The jogger fences 24a, 24b are the alignment boards that align the sheet P, conveyed from the image forming apparatus 1, in a width direction.

The staple-containing stitching unit 30 of the above-described sheet processing device 2 is a unit that uses staples (metallic staples) 31 to permanently stitch the sheet bundle PB, and it includes a staple-containing stitching-unit movement guide rail 32, a staple-containing stitching-unit home position sensor 33, and the like. The staple-containing stitching-unit movement guide rail 32 is a rail that guides movement of the staple-containing stitching unit 30 such that the staple-containing stitching unit 30 may move over the entire area in a sheet width direction in a stable manner. The staple-containing stitching-unit home position sensor 33 is provided on one end of the staple-containing stitching-unit movement guide rail 32, and it detects the position of the staple-containing stitching unit 30. The position that is detected by the staple-containing stitching-unit home position sensor 33 is the home position of the staple-containing stitching unit 30.

The staple-free stitching unit 40 is a unit that conducts temporary stitching by using a press-and-stitch technique, or the like, without using any metallic staples, and it includes a staple-free stitching-unit movement guide rail 42, a staple-free stitching-unit home position sensor 43, and the like. The staple-free stitching-unit movement guide rail 42 is a rail that guides movement of the staple-free stitching unit 40 such that the staple-free stitching unit 40 may move in a sheet width direction in a stable manner. The staple-free stitching-unit home position sensor 43 is provided on one end of the staple-free stitching-unit movement guide rail 42 and at the opposite of the side where the staple-containing stitching-unit home position sensor 33 is provided, and it detects the position of the staple-free stitching unit 40. The position that is detected by the staple-free stitching-unit home position sensor 43 is the home position of the staple-free stitching unit 40.

Figure 5:
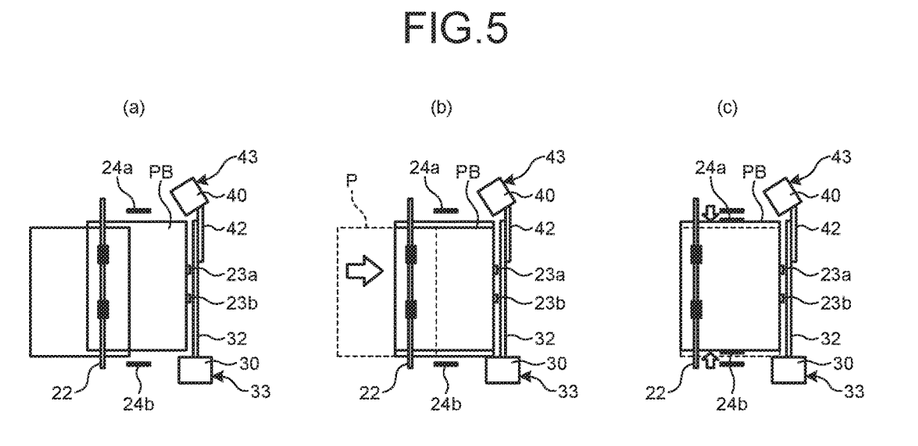
FIG. 5 is top view that illustrates an operation to align a sheet by the sheet processing device.

FIG. 5 is top view that illustrates an operation to align a sheet by the sheet processing device. As illustrated in FIG. 5(a), after the sheet P is conveyed from the image forming apparatus 1, it is conveyed into the sheet aligning unit 21 by the conveyance roller 22. Then, as illustrated in FIG. 5(b), after the sheet P is conveyed by the conveyance roller 22, its trailing edge is brought into contact with the trailing-edge alignment stoppers 23a, 23b so that it is aligned in a conveying direction. As illustrated in FIG. 5(c), after the sheet P is brought into contact with the trailing-edge alignment stoppers 23a, 23b, the jogger fences 24a, 24b are driven so that it is aligned in the width direction that is perpendicular to the conveying direction, whereby alignment of the sheet bundle PB is completed.

Figure 6:
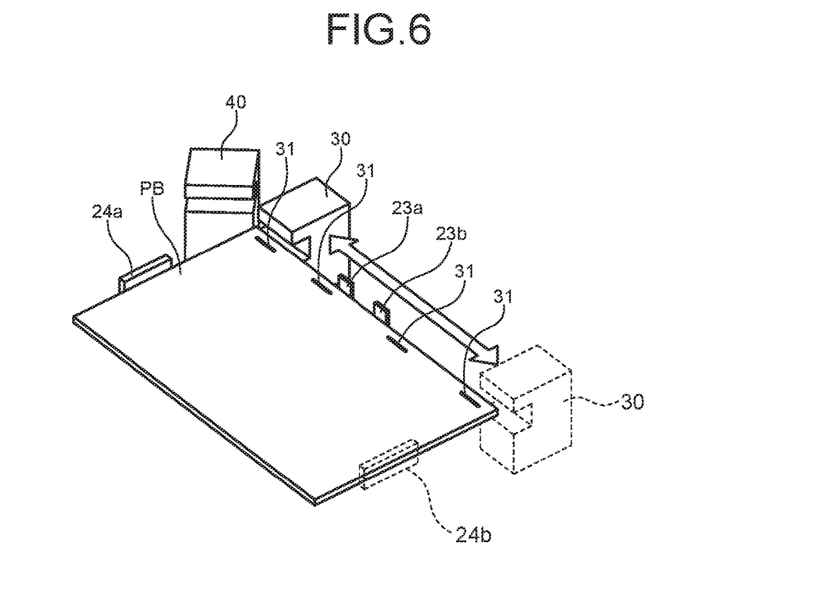
FIG. 6 is a perspective view that illustrates a stitching process of a staple-containing stitching unit.
Figure 7:
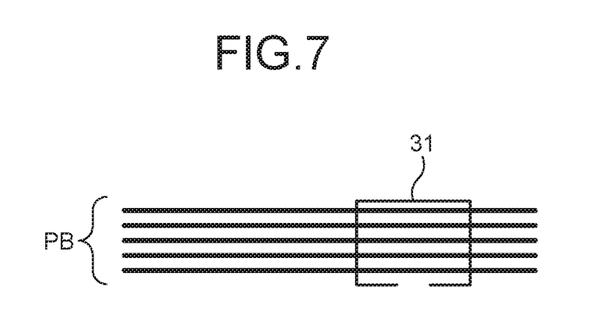
FIG. 7 is a configuration diagram that illustrates a configuration of a bundle of sheets and staples after a stitching process is completed.

FIG. 6 is a perspective view that illustrates a stitching process of the staple-containing stitching unit. FIG. 7 is a configuration diagram that illustrates a configuration of the bundle of sheets and the staples after the stitching process is completed. As illustrated in FIG. 6, if a stitching process of the staple-containing stitching unit 30 is selected, the staple-containing stitching unit 30 is moved from the home position to the predetermined position in the direction of the arrow in the drawing along the staple-containing stitching-unit movement guide rail 32. Then, when the staple-containing stitching unit 30 is ready at the predetermined position, it delivers a staple 31 to penetrate it through the sheet bundle PB, folds the projected end, and terminates the stitching process as illustrated in FIG. 7. Furthermore, as described later, the moving angle or the moving distance of the staple-containing stitching unit 30 is controlled by the control unit 10 and the stitching-process control unit 20 so that a stitching process may be performed by adjusting the stitching direction or the stitching area.

Figure 8:
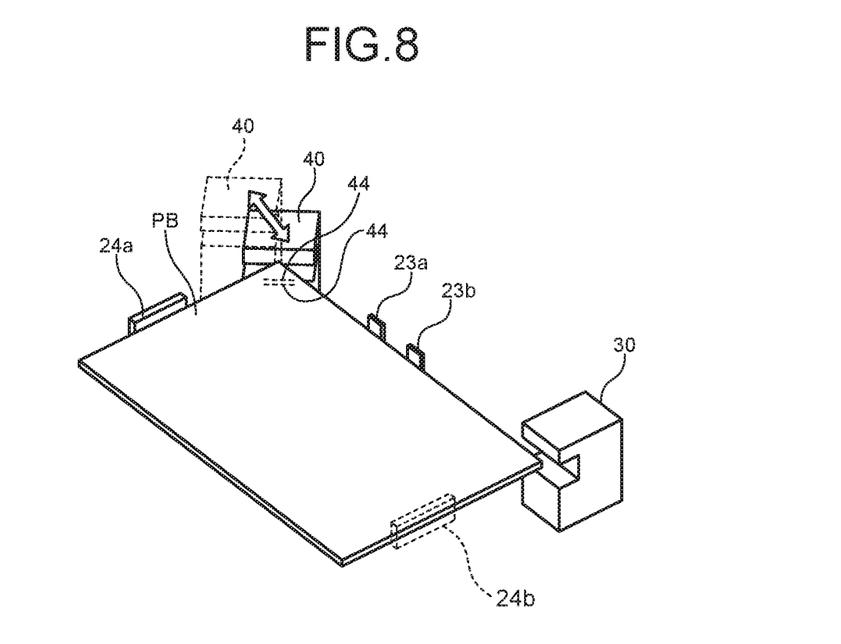
FIG. 8 is a perspective view that illustrates a stitching process of a staple-free stitching unit.
Figure 9:
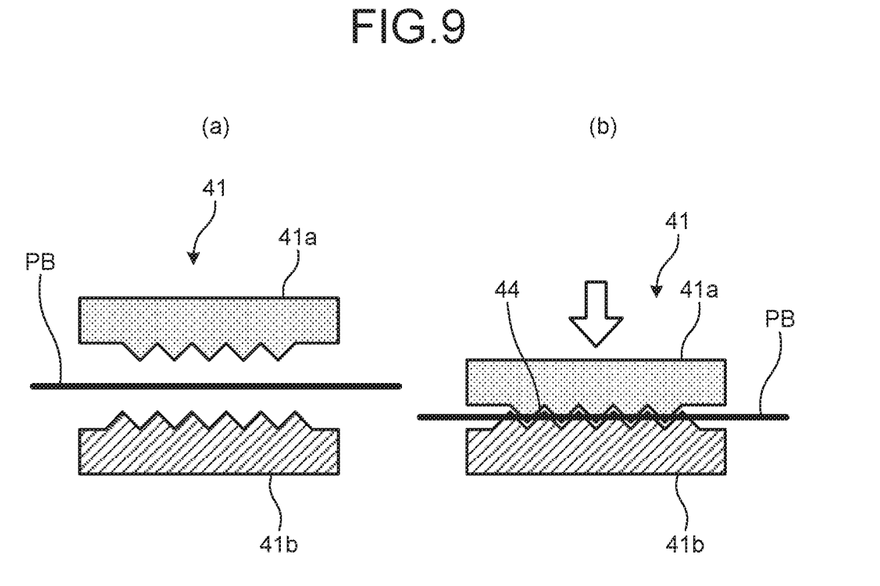
FIG. 9 is cross-sectional view that illustrate situations before and after the sheet is pressed by a stitcher of the staple-free stitching unit.

FIG. 8 is a perspective view that illustrates a stitching process of the staple-free stitching unit. FIG. 9 is cross-sectional view that illustrates situations before and after the sheet is pressed by a stitcher of the staple-free stitching unit. As illustrated in FIG. 9(a), a stitcher 41 of the staple-free stitching unit 40 includes a pair of upper stitching teeth 41a and lower stitching teeth 41b one above the other, having the concavity and convexity on its front surface. As illustrated in FIG. 8, if the stitching process of the staple-free stitching unit 40 is selected, the staple-free stitching unit 40 is moved from the home position to the predetermined position along the staple-free stitching-unit movement guide rail 42 in the direction of the arrow in the drawing. Here, as illustrated in FIG. 9(a), the stitcher 41 of the staple-free stitching unit 40 is in a state such that the upper stitching teeth 41a and the lower stitching teeth 41b are separated from each other. Then, when the staple-free stitching unit 40 is ready at the predetermined position, the stitcher 41 nips the sheet bundle PB by using the upper stitching teeth 41a and the lower stitching teeth 41b, presses and deforms the sheet bundle PB so that the fibers tangle each other, and forms a stitching teeth mark 44, which becomes a stitching area, thereby performing a stitching process, as illustrated in FIG. 9(b).

Furthermore, as described later, the moving distance of the staple-free stitching unit 40 is controlled by the control unit 10 and the stitching-process control unit 20 so that the multiple stitching teeth marks 44 may be formed on the corner of the sheet bundle PB.

Furthermore, the stitcher of the staple-free stitching unit 40 is not limited to the stitcher 41 that uses the press-and-stitch technique, illustrated in FIG. 9. For example, it is possible to use a cut-and-fold-and-stitch technique, or the like, that makes a U-shaped cut on a bundle of sheets and folds it, simultaneously forms a slit in the neighborhood of the folded area, and inserts the cut and folded end into the slit so that it does not come loose.

Furthermore, with the stitching process of the staple-free stitching unit 40, it is possible to save the trouble of removing metallic staples from the bundle of sheets when the sheet bundle PB is disposed of or when it is shredded; thus, wasteful resources may be reduced, and recycling efficiency is improved. Moreover, the allowable number of processed sheets, which may be subjected to a stitching process at one time, of the staple-free stitching unit 40 is smaller than that of the staple-containing stitching unit 30, and it takes more time to form the single stitching teeth mark 44, compared to the staple-containing stitching unit 30. Therefore, according to the present embodiment, users may select the processing mode, described below, under various situations such as user's task progress.

Figure 10:
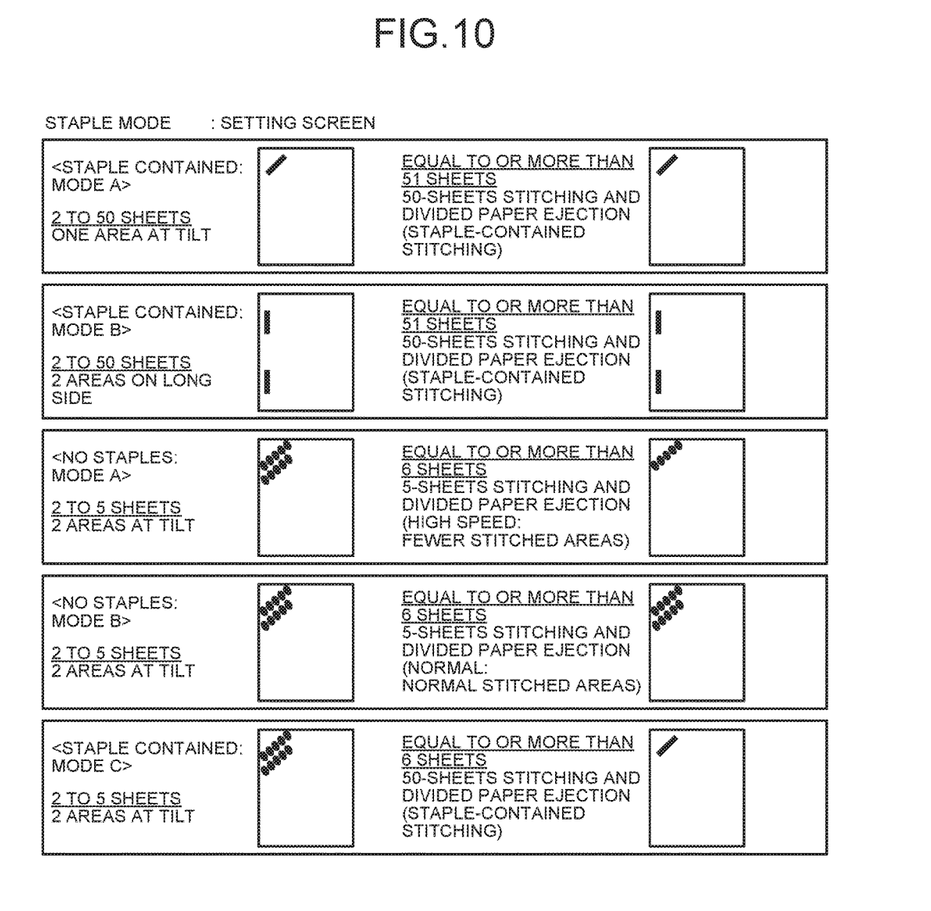
FIG. 10 is an explanatory diagram that illustrates an example of the screen for selecting/executing a stitching process, displayed in a display operating unit.

FIG. 10 is an explanatory diagram that illustrates an example of the screen for selecting/executing the stitching process, displayed in the display operating unit 12. According to the present embodiment, a user may select a mode for the stitching process from the display operating unit 12 at a predetermined timing. In the display operating unit 12, if a user selects execution of the stitching process, the operation screen, illustrated in FIG. 10, is displayed. Furthermore, according to the present embodiment, the allowable number of processed sheets of the staple-containing stitching unit 30 is 50, and the allowable number of processed sheets of the staple-free stitching unit 40 is 5; however, it is obvious that the allowable numbers of processed sheets may be the numbers that are appropriately determined in accordance with the type of sheet, the thickness, or the basis weight.

If a staple-containing mode A, illustrated in FIG. 10, is selected, the control unit 10 first determines whether the number of sheets in the sheet bundle PB, which is the target to be stitched, is equal to or less than 50, which is the allowable number of stitching-processed sheets of the staple-containing stitching unit 30. The operation information from the display operating unit 12 and the determination result of the control unit 10 are sent to the stitching-process control unit 20, which also serves as the stitched-sheet number acquiring unit, via the communication unit 11 and the communication unit 25. If the control unit 10 determines that the number of sheets in the sheet bundle PB, which is the target to be stitched, is 2 to 50, it causes the image forming apparatus 1 to output all the sheets and conveys them to the sheet processing device 2. In the sheet processing device 2, the staple-containing stitching unit 30 is selected by the stitching-process control unit 20, the conveyed sheet P is aligned by the sheet aligning unit 21, a staple-containing stitching process is performed by using the staple 31 on the single area of the corner of the sheet bundle PB as illustrated in FIG. 10, and then this process is terminated.

Conversely, if the control unit 10 determines that the number of sheets in the sheet bundle, which is the target to be stitched, is equal to or more than 51, it divides the number of output sheets by 50, which is the allowable number of stitching-processed sheets, causes the image forming apparatus 1 to output 50 sheets, which is the first sheet bundle PB, and conveys them to the sheet processing device 2. In the sheet processing device 2, the staple-containing stitching unit 30 is selected by the stitching-process control unit 20, the conveyed sheet P is aligned by the sheet aligning unit 21, and the staple-containing stitching process is performed by using the staple 31 on the single area of the corner of the sheet bundle PB as illustrated in FIG. 10.

Furthermore, the control unit 10 determines whether the sheet bundle PB, which is the target to be stitched, contains a sheet that has not been output yet. If the control unit 10 determines that it is contained, it causes the image forming apparatus 1 to output the sheet and conveys it to the sheet processing device 2. As described above, the sheet processing device 2 performs a staple-containing stitching process by using the staple 31 on the single area of the corner of the sheet bundle PB. This sequence of operations is repeated and, if the control unit 10 determines that there is no sheet to be output, this process is terminated. Furthermore, dividing the number of output sheets by the allowable number of stitching-processed sheets here includes a case where the number of output sheets, which is finally divided, is equal to or less than the allowable number of stitching-processed sheets. For example, if the number of sheets in the sheet bundle PB, which is the target to be stitched, is 60, the bundle of 50 sheets and the bundle of remaining 10 sheets are sequentially conveyed from the image forming apparatus 1 to the sheet processing device 2.

Next, if a staple-containing mode B is selected as illustrated in FIG. 10, it is the same as the above-described staple-containing mode A; however, a different area is stitched by the staple-containing stitching unit 30. During the staple-containing mode B, in the sheet processing device 2, the staple-containing stitching unit 30 is selected by the stitching-process control unit 20, the conveyed sheet P is aligned by the sheet aligning unit 21, and a staple-containing stitching process is performed by using the staples 31 on two areas of the long side of the sheet bundle PB as illustrated in FIG. 10.

Next, if a staple-free mode A is selected as illustrated in FIG. 10, the control unit 10 first determines whether the number of sheets in the sheet bundle, which is the target to be stitched, is equal to or less than 5, which is the allowable number of stitching-processed sheets of the staple-free stitching unit 40. The operation information from the display operating unit 12 and the determination result of the control unit 10 are transmitted to the stitching-process control unit 20 via the communication unit 11 and the communication unit 25. If the control unit 10 determines that the number of output sheets is 2 to 5, it causes the image forming apparatus 1 to output all the sheets and conveys them to the sheet processing device 2. In the sheet processing device 2, the staple-free stitching unit 40 is selected by the stitching-process control unit 20, the conveyed sheet P is aligned by the sheet aligning unit 21, a staple-free stitching process is performed to form the stitching teeth marks 44 on two different areas of the corner of the sheet bundle PB as illustrated in FIG. 10, and this process is terminated. The normal mode of the staple-free stitching process is to perform a staple-free stitching process so as to form the stitching teeth marks 44 on two different areas.

Conversely, if the control unit 10 determines that the number of sheets in the sheet bundle PB, which is the target to be stitched, is equal to or more than 6, it divides the number of output sheets by 5, which is the allowable number of stitching-processed sheets, causes the image forming apparatus 1 to output the 5 sheets, which are the first sheet bundle, and conveys them to the sheet processing device. Then, the image forming apparatus 1 temporarily stops image formation in accordance with the stitching processing time of the staple-free stitching unit 40. In the sheet processing device 2, the staple-free stitching unit 40 is selected by the stitching-process control unit 20, the conveyed sheet P is aligned by the sheet aligning unit, and a staple-free stitching process is performed to form the stitching teeth mark 44 on the single area of the corner of the sheet bundle PB, which is fewer than the two areas during the normal mode, as illustrated in FIG. 10.

Furthermore, the control unit 10 determines whether the sheet bundle PB, which is the target to be stitched, contains the sheet P that has not been output yet. If the control unit 10 determines that it is contained, it causes the image forming apparatus 1 to output the sheet P, conveys it to the sheet processing device 2, and temporarily stops image formation in accordance with the stitching processing time of the staple-free stitching unit 40. Then, after the sheet P is conveyed, the sheet processing device 2 performs a staple-free stitching process to form the stitching teeth mark 44 on the single area of the corner of the sheet bundle PB as described above. This sequence of operations is repeated and, if the control unit 10 determines that there are no sheet P to be output, this process is terminated.

While in the staple-free mode A, a staple-free stitching process is performed after the number of output sheets is divided by 5; however, as the number of the stitching teeth marks 44 to be formed by the staple-free stitching unit 40 is reduced, the time it takes to perform a stitching process may be significantly shortened, and the user's task efficiency may be improved.

Next, if a staple-free mode B is selected as illustrated in FIG. 10, the control unit first determines whether the number of output sheets is equal to or less than 5, which is the allowable number of stitching-processed sheets of the staple-containing stitching unit. The operation information from the display operating unit 12 and the determination result of the control unit 10 are transmitted to the stitching-process control unit 20 via the communication unit 11 and the communication unit 25. If the control unit 10 determines that the number of output sheets is 2 to 5, it causes the image forming apparatus 1 to output all the sheets P and conveys them to the sheet processing device 2. In the sheet processing device 2, the staple-free stitching unit 40 is selected by the stitching-process control unit 20, the conveyed sheet P is aligned by the sheet aligning unit 21, a staple-free stitching process is performed to form the stitching teeth marks 44 on two different areas of the corner of the sheet bundle PB, and this process is terminated.

Conversely, if the control unit 10 determines that the number of sheets in the sheet bundle PB, which the target to be stitched, is equal to or more than 6, it divides the number of output sheets by 5, which is the allowable number of stitching-processed sheets, causes the image forming apparatus 1 to output the 5 sheets, which is the first bundle of sheets, and conveys them to the sheet processing device 2. Then, the image forming apparatus 1 temporarily stops image formation in accordance with the stitching processing time of the staple-free stitching unit 40. In the sheet processing device 2, the staple-free stitching unit 40 is selected by the stitching-process control unit 20, the conveyed sheet P is aligned by the sheet aligning unit 21, and a staple-free stitching process (normal mode) is performed to form the stitching teeth marks 44 on the two areas of the corner of the sheet bundle PB as illustrated in FIG. 10.

Furthermore, the control unit 10 determines whether the sheet bundle PB, which is the target to be stitched, contains the sheet P that has not been output yet. If the control unit 10 determines that it is contained, it causes the image forming apparatus 1 to output the sheet P, conveys it to the sheet processing device 2, and temporarily stops image formation in accordance with the stitching processing time of the staple-free stitching unit 40. Then, after the sheet P is conveyed, the sheet processing device 2 performs a staple-free stitching process to form the stitching teeth marks 44 on two areas of the corner of the sheet bundle PB as described above. This sequence of operations is repeated and, if the control unit 10 determines that there are no sheet P to be output, this process is terminated.

If a staple-free mode C is selected as illustrated in FIG. 10, the control unit 10 first determines whether the number of output sheets is equal to or less than 5, which is the allowable number of stitching-processed sheets of the staple-free stitching unit 40. With regard to the operation information from the display operating unit 12 and the determination result of the control unit 10, the information is transmitted to the stitching-process control unit 20 via the communication unit 11 and the communication unit 25. If the control unit 10 determines that the number of output sheets is 2 to 5, it causes the image forming apparatus 1 to output all the sheets and conveys them to the sheet processing device 2. In the sheet processing device 2, the staple-free stitching unit 40 is selected by the stitching-process control unit 20, the conveyed sheet P is aligned by the sheet aligning unit 21, and a staple-free stitching process is performed to form the stitching teeth marks 44 on two different areas of the corner of the sheet bundle PB.

Conversely, if the control unit 10 determines that the number of sheets in the sheet bundle PB, which is the target to be stitched, is equal to or more than 6, it divides the number of output sheets by 50, which is the allowable number of stitching-processed sheets of the staple-containing stitching unit 30, causes the image forming apparatus 1 to output the sheets (equal or less than 50), which is the first bundle of sheets, and conveys them to the sheet processing device 2. In the sheet processing device 2, the staple-containing stitching unit 30 is selected by the stitching-process control unit 20, the conveyed sheet P is aligned by the sheet aligning unit 21, and a staple-containing stitching process is performed by using the staple 31 on the single area of the corner of the sheet bundle PB as illustrated in FIG. 10.

Furthermore, the control unit 10 determines whether the sheet bundle PB, which is the target to be stitched, contains the sheet P that has not been output yet. If the control unit 10 determines that it is contained, it causes the image forming apparatus 1 to output the sheet and conveys it to the sheet processing device 2 and, in the sheet processing device 2, to which the sheet P has been conveyed, a staple-containing stitching process is performed by using the staple 31 on the single area of the corner of the sheet bundle PB as described above. This sequence of operations is repeated and, if the control unit 10 determines that there is no sheet to be output, this process is terminated.

Heretofore, in the present embodiment, an explanation is given of the embodiment where, in the staple-free mode A, the time it takes to perform the stitching process is shortened, and user's task efficiency is improved; however, there is no limitation on the setting modes. For example, the setting mode is set and displayed, in which the number of times the stitching teeth mark is formed (the number of stitched areas) is larger than that in the normal mode, whereby it is possible to deal with a user who desires to tightly stitch a bundle of sheets by using a staple-free stitching unit regardless of the time it takes to perform a stitching process.

The above descriptions are examples, and each of the following aspects has a peculiar advantage.

(Aspect A)

A sheet processing device, such as the sheet processing device 2, includes a stacking unit, such as the sheet aligning unit 21, that stacks multiple sheets, such as the sheets P, to obtain a sheet bundle, such as the sheet bundle PB; a stitched-sheet number acquiring unit, such as the stitching-process control unit 20, that acquires the number of sheets in the sheet bundle, which is the target to be stitched; a permanent stitching unit, such as the staple-containing stitching unit 30, that permanently stitches the sheet bundle; a temporary stitching unit, such as the staple-free stitching unit 40, that is capable of temporarily stitching multiple areas of the sheet bundle; and a selecting unit, such as the stitching-process control unit 20, that selects any one of the permanent stitching unit and the temporary stitching unit to be used, and it includes a stitching-process control unit, such as the stitching-process control unit 20, that, when the temporary stitching unit is selected by the selecting unit, controls the temporary stitching unit so as to change the number of areas, such as the stitching teeth marks 44, that are stitched by the temporary stitching unit.

Thus, as explained in the above-described embodiment, users may select an intended stitching processing method depending on the situation. Specifically, if a user desires a temporary stitching process although there is a large number of sheets in the sheet bundle, which is the target to be stitched, and it is difficult to take much time on the stitching process, it is possible to select a temporary stitching process where the sheet bundle is divided and the number of stitched areas is reduced. Thus, a desired temporary stitching process may be selected by users, the time needed for a stitching process may be shortened compared to a conventional case where a temporary stitching process is performed on the divided sheet bundle without decreasing the number of stitched areas, and task efficiency may be improved. Furthermore, if stitching needs to be tight by using the temporary stitching unit regardless of the time it takes to perform a stitching process, the number of stitched areas may be increased.

(Aspect B)

In the sheet processing device of (aspect A), when the temporary stitching unit is selected by the selecting unit, and in a case where the number of sheets in the sheet bundle, which is the target to be stitched, acquired by the stitched-sheet number acquiring unit, exceeds the allowable number of temporary-stitching processed sheets of the temporary stitching unit, the stitching-process control unit controls the stacking unit so as to stack the sheet bundle, which is the target to be stitched, after dividing the sheet bundle by a sheet bundle that contains the number of sheets that is equal to or less than the allowable number of temporary-stitching processed sheets, and it controls the temporary stitching unit so as to perform a stitching process while decreasing the number of stitched areas compared to the number of stitched areas by the temporary stitching unit in a case where the number of sheets in the sheet bundle, which is the target to be stitched, is equal to or less than the allowable number of temporary-stitching processed sheets.

Thus, as explained in the above-described embodiment, if a user desires a temporary stitching process although there is a large number of sheets in the sheet bundle, which is the target to be stitched, and it is difficult to take much time on the stitching process, it is possible to select a temporary stitching process where the sheet bundle is divided and the number of stitched areas is reduced. Thus, a desired temporary stitching process may be selected by users, the time needed for a stitching process may be shortened compared to a conventional case where a temporary stitching process is performed on the divided sheet bundle without decreasing the number of stitched areas, and task efficiency may be improved.

(Aspect C)

In the sheet processing device of (aspect A) or (aspect B), when the temporary stitching unit is selected by the selecting unit, and in a case where the number of sheets in the sheet bundle, which is the target to be stitched, acquired by the stitched-sheet number acquiring unit, exceeds the allowable number of temporary-stitching processed sheets of the temporary stitching unit, the control unit is capable of executing at least a first temporary stitching mode, such as the staple-free mode A, for controlling the stacking unit so as to stack the sheet bundle, which is the target to be stitched, after dividing the sheet bundle by a sheet bundle that contains the number of sheets that is equal to or less than the allowable number of temporary-stitching processed sheets and for controlling the temporary stitching unit so as to perform a stitching process while decreasing the number of stitched areas compared to the number of areas that are stitched by the temporary stitching unit in a case where the number of sheets in the sheet bundle, which is the target to be stitched, is equal to or less than the allowable number of temporary-stitching processed sheets; and a second temporary stitching mode, such as the staple-free mode B, for controlling the stacking unit so as to stack the sheet bundle, which is the target to be stitched, after dividing the sheet bundle by a sheet bundle that contains the number of sheets that is equal to or less than the allowable number of temporary-stitching processed sheets and for controlling the temporary stitching unit so as to perform a stitching process on the number of stitched areas that is identical to the number of areas that are stitched by the temporary stitching unit in a case where the number of sheets in the sheet bundle, which is the target to be stitched, is equal to or less than the allowable number of temporary-stitching processed sheets.

Thus, as explained in the above-described embodiment, users may select a stitching processing method depending on the situation. Specifically, if a user desires a temporary stitching process although there are a large number of sheets in the sheet bundle, which is the target to be stitched, and it is difficult to take much time on the stitching process, the first temporary stitching mode is selected. Thus, a desired temporary stitching process may be selected by users, and task efficiency may be improved compared to a conventional case where a temporary stitching process is performed on the divided sheet bundle without decreasing the number of stitched areas. Moreover, the second temporary stitching mode is selected if a temporary stitching process is desired instead of a permanent stitching process although there are a large number of sheets in the sheet bundle, which is the target to be stitched, and if the power of a stitching process does not need to be lower or if there is enough time. Thus, users may obtain desired stitching processing results.

(Aspect D)

An image forming system includes an image forming apparatus, such as the image forming apparatus 1, that forms an image on a sheet, such as the sheet P; and a sheet processing device, such as the sheet processing device 2, that performs a predetermined process on a sheet, on which an image has been formed by the image forming apparatus, wherein the sheet processing device of (aspect A) or (aspect B) is used as the above-described sheet processing device.

Thus, as explained in the above-described embodiment, users may obtain desired stitching processing results.

(Aspect E)

In the image forming system of (aspect D), the control unit, such as the control unit 10, temporarily stops image formation by the image forming apparatus in accordance with the time that is needed for a stitching process in a case where the number of stitched sheets, acquired by the stitched-sheet number acquiring unit, exceeds the allowable number of stitching-processed sheets of the temporary stitching unit.

Thus, as explained in the above-described embodiment, a temporary stitching process is performed while image formation by the image forming apparatus is temporarily stopped in accordance with the time that is needed for a temporary stitching process, whereby a stitching process is performed by the sheet processing device in a smooth way.

(Aspect F)

In the image forming system of (aspect D) or (aspect E), the above-described image forming apparatus includes a display operating unit, such as the display operating unit 12, that, in a case where the number of sheets in the sheet bundle, which is the target to be stitched, exceeds the allowable number of stitching-processed sheets of the temporary stitching unit, displays at least any one of the first temporary stitching mode and the second temporary stitching mode to be executed so that a user makes a selection for an operation.

Thus, as explained in the above-described embodiment, users may select an appropriate stitching processing method and stitching power depending on the situation via the display operating unit.

According to the present embodiments, it is possible that users obtain desired stitching processing results.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A sheet processing device comprising:
a stacking unit configured to stack a plurality of sheets to obtain a sheet bundle;
a staple-containing stitching unit configured to stitch the sheet bundle using one or more staples;
a staple-free stitching unit configured to stitch a plurality of areas of the sheet bundle without using any staples or adhesive agents; and
a stitching-process controller configured to,
acquire a number of sheets to be stitched, select any one of the staple-containing stitching unit and the staple-free stitching unit to be used for stitching the sheet bundle, and in response to the staple-free stitching unit being selected, and in a case where the number of sheets to be stitched exceeds a threshold number of sheets that are stitched at one time by the staple-free stitching unit, control the staple-free stitching unit to execute a first staple-free stitching mode in which a reduced number of areas of the sheet bundle stitched by the staple-free stitching unit as compared to a number of areas of the sheet bundle that are stitched by the staple-free stitching unit upon the number of sheets to be stitched being equal to or less than the threshold number of sheets.

2. The sheet processing device according to claim 1, wherein the stitching-process controller is configured to, in response to the staple-free stitching unit being selected, and in the case where the number of sheets to be stitched exceeds the threshold number of sheets that are stitched at one time by the staple-free stitching unit, control the staple-free stitching unit to execute a second staple-free stitching mode in which a number of areas of the sheet bundle are stitched by the staple-free stitching unit that is identical to the number of areas of the sheet bundle that are stitched by the staple-free stitching unit in the case where the number of sheets to be stitched is equal to or less than the threshold number of sheets.

3. An image forming system comprising:
an image forming apparatus configured to perform image formation on sheets and output the sheets; and
the sheet processing device according to claim 2.

4. The image forming system according to claim 3, wherein the image forming apparatus comprises a controller configured to:
determine whether the number of sheets to be stitched exceeds the threshold number of sheets that are stitched at one time by the staple-free stitching unit;
in the case where the number of sheets to be stitched exceeds the threshold number of sheets, divide the number of sheets to be stitched by the threshold number of sheets;
cause the image forming apparatus to convey the threshold number of sheets to the sheet processing device, wherein the stitching-process controller is configured to control the stacking unit to stack the threshold number of sheets to obtain a first divided sheet bundle to be stitched by the staple-free stitching unit;
temporarily stop image formation by the image forming apparatus in accordance with a stitching processing time of the staple-free stitching unit for stitching the first divided sheet bundle;
resume image formation by the image forming apparatus after the stitching processing time of the staple-free stitching unit has elapsed; and
cause the image forming apparatus to convey a number of sheets that is equal to or less than the threshold number of sheets to the sheet processing device, wherein the stitching-process controller is configured to control the stacking unit to stack the number of sheets that is equal to or less than the threshold number of sheets to obtain a second divided sheet bundle to be stitched by the staple-free stitching unit.

5. The image forming system according to claim 3, wherein the image forming apparatus includes a display operating unit configured to, in the case where the number of sheets to be stitched exceeds the threshold number of sheets that are stitched at one time by the staple-free stitching unit, display at least any one of the first staple-free stitching mode and the second staple-free stitching mode for selection by a user.

6. A sheet processing device comprising:
a pair of members each including concave and convex portions and configured to nip a sheet bundle between the pair of members to stitch the sheet bundle;
an operating unit configured to select a processing mode between a first mode and a second mode according to input by a user; and
a stitching-process controller configured to,
acquire a number of sheets to be stitched,
determine the selected processing mode, and
in a case where the number of sheets to be stitched exceeds a threshold number of sheets that are stitched at one time by the pair of members, control the pair of members to stitch a first number of areas of the sheet bundle in response to the first mode being selected, and to stitch a second number of areas of the sheet bundle in response to the second mode being selected, wherein the first number is less than the second number.

7. The sheet processing device according to claim 6, wherein the first number is one.

8. The sheet processing device according to claim 6, wherein, in a case where the number of sheets to be stitched does not exceed the threshold number of sheets, the stitching-process controller is configured to control the pair of members to stitch the second number of areas of the sheet bundle.

9. The sheet processing device according to claim 6, wherein, in the case where the number of sheets to be stitched exceeds the threshold number of sheets, the stitching-process controller is configured to control the pair of members to stitch the sheet bundle after the number of sheets to be stitched is divided by the threshold number of sheets to obtain the sheet bundle.

* * * * *

UNITED STATES PATENT AND TRADEMARK OFFICE
CERTIFICATE OF CORRECTION

PATENT NO. : 10,097,711 B2
APPLICATION NO. : 15/163850
DATED : October 9, 2018
INVENTOR(S) : Nobuyoshi Suzuki et al.

Page 1 of 1

It is certified that error appears in the above-identified patent and that said Letters Patent is hereby corrected as shown below:

On the Title Page (73) Assignee should read: Ricoh Company, Ltd., Tokyo (JP)

Signed and Sealed this
Sixteenth Day of July, 2019

Andrei Iancu
*Director of the United States Patent and Trademark Office*